May 27, 1941.                J. MAGYAROSI                2,243,388
                           FISHING ROD HOLDER
                         Filed Sept. 11, 1940              2 Sheets-Sheet 1
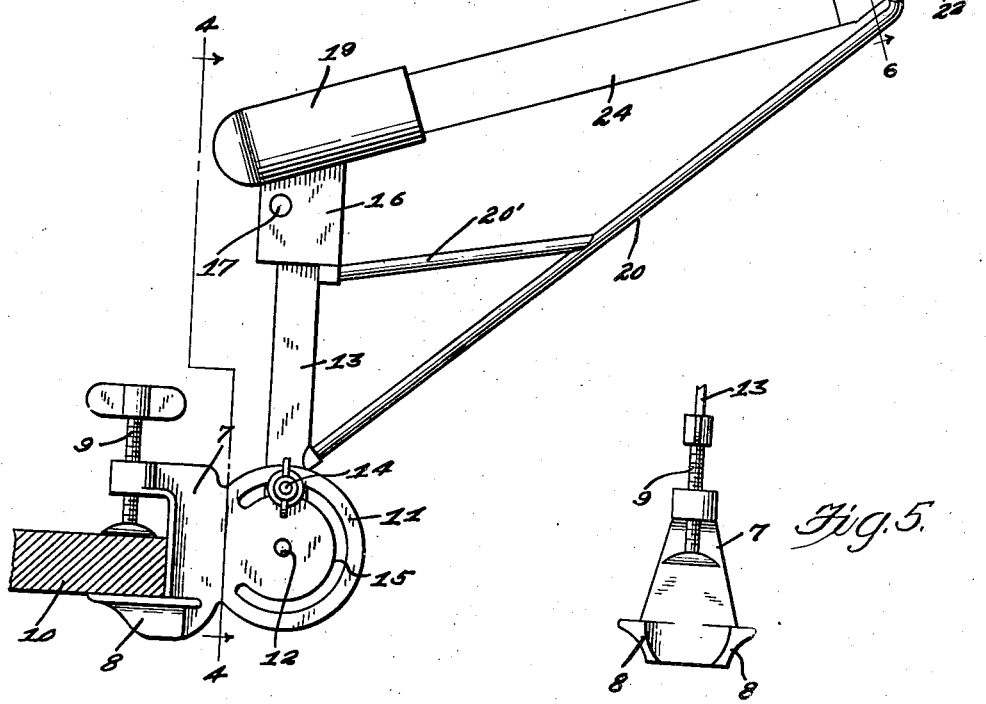
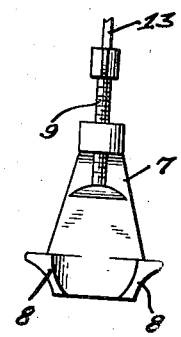
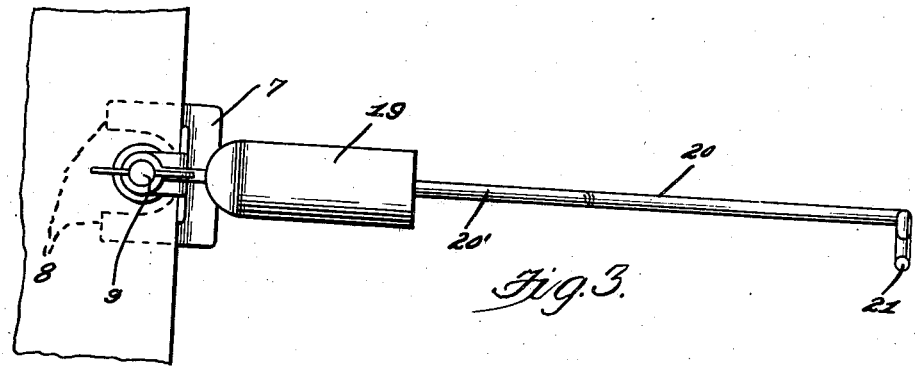
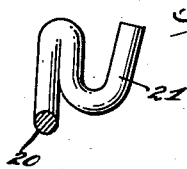
Inventor
Joseph Magyarosi
By  Clarence A. O'Brien
Attorney

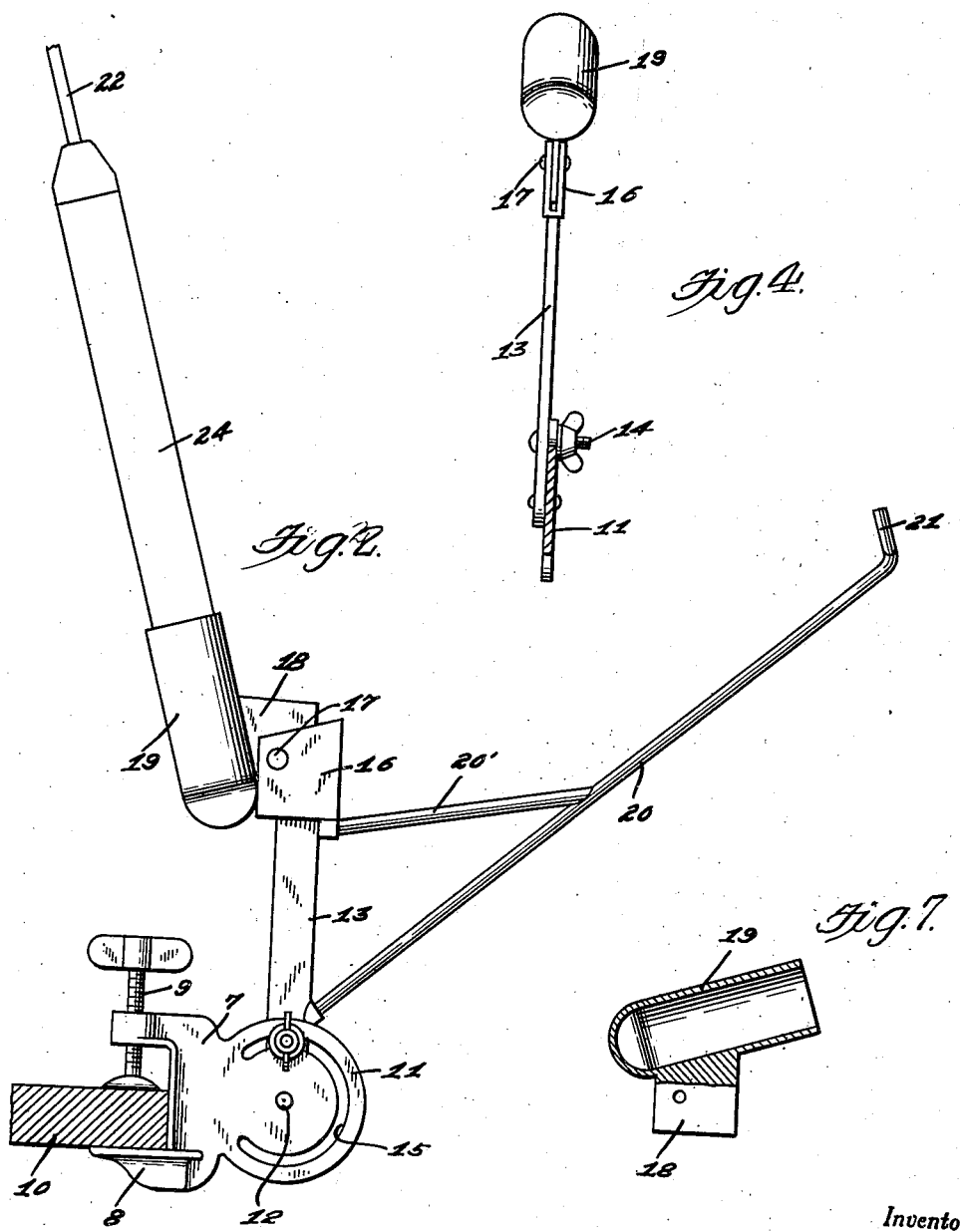

Patented May 27, 1941

2,243,388

UNITED STATES PATENT OFFICE 2,243,388

FISHING ROD HOLDER

Joseph Magyarosi, Columbus, Ohio

Application September 11, 1940, Serial No. 356,379

1 Claim. (Cl. 248—42)

This invention relates to devices particularly designed for holding fishing poles in the desired position while in use, and an object of the present invention is to provide a holder having certain useful improvements over such type of holders as now known and used.

Further in accordance with the present invention a holder of the character stated is equipped as to facilitate the engagement of the handle of the fishing pole with the holder; to facilitate the removal of the handle from said holder; and to secure the pole on the holder against displacement in the event of a jerk on the line.

The invention together with its objects and advantages will be best understood from a study of the following description taken in connection with the accompanying drawings wherein:

Figure 1 is a side elevational view illustrating the application of the invention.

Figure 2 is a view somewhat similar to Figure 1 but showing the handle-receiving socket swung to a substantially vertical position.

Figure 3 is a plan view of the holder.

Figure 4 is a detail sectional view taken substantially on the line 4—4 of Figure 1.

Figure 5 is an elevational view of the clamp forming part of the invention.

Figure 6 is a detail sectional view taken substantially on the line 6—6 of Figure 1, and Figure 7 is a sectional view through the socket forming part of the invention.

Referring more in detail to the drawings it will be seen that in the preferred embodiment thereof the holder embodies a clamp 7 having a jaw 8 and a screw 9 cooperable with the jaw 8 in the manner shown for positively securing the clamp 7 to a selected support 10, as for example the gunwale of a boat.

The clamp 7 has formed integral therewith a lug 11 to which is pivoted as at 12 a post 13.

The post 13 is secured at the desired perpendicular position, or at the desired angle to the perpendicular through the medium of a nut-equipped stud 14 carried by the post and working in an arcuate slot 15 provided in the lug 11 as shown.

The post 13 is provided on its free end with a head 16 in the form of spaced parallel members between which is pivoted as at 17 a lug 18 formed integral with a socket 19. It will thus be seen that the socket 19 is mounted on the post 13 for vertical swinging movement relative to the post.

Extending upwardly and outwardly from the post 13 and at an acute angle to the post is a rest-rod 20 that is braced with respect to the post 13 by a brace member 20'.

At the free end thereof the rest-rod 20 terminates in a plane above the head 16 of the post, and at said upper end is formed to present a laterally extending substantially U-shaped prong 21 which receives the shank 22 of the fishing rod, a portion of which is shown in the drawings and indicated generally by the reference numeral 23.

With the holder mounted in position on the part 10 it will be seen that the rod 23 may be readily associated with the holder by inserting the butt end of the handle 24 of said rod 23 into the socket 19, with the latter in the position shown in Figure 2. Upon such engagement of the handle 24 with the socket 19 the rod 23 and socket 19 are swung, as a unit, from the position shown in Figure 2, to the position shown in Figure 1. Such swinging movement of the rod 23 and socket 19 will result in the shank 22 of the rod 23 engaging in the U-shaped prong 21 so that the latter, in association with the socket 19, will support the rod 23 at the desired angle.

It will also be noted that the handle 24 so fits in the socket 19 and extends between the socket 19 and the prong 21 as to preclude longitudinal movement of the rod 23 as might result in a withdrawal of the handle 24 from the socket 19.

Thus it will be seen that with this holder the fishing rod 23 will be retained securely in position and against casual or accidental displacement resulting, for example, from a sudden jerk being imparted to the line, and as might happen upon a fish being snagged on the hook of the latter.

It is thought that the simplicity and advantages of a fishing-rod holder embodying the features of the present invention are sufficiently apparent as not to require further detailed description of the device.

Having thus described the invention what is claimed as new is:

In a holder for fishing rods, a clamp, a post pivoted to the clamp, interengaging means on the post and clamp for securing the post at the desired position of angular adjustment relative to the clamp, a handle receiving socket pivotally mounted on the post, a rest-rod extending angularly from said post and terminating in a supporting prong disposed substantially in alignment with said socket and for receiving the shank of a fishing rod with the handle of said rod seating in said socket.

JOSEPH MAGYAROSI.